Aug. 23, 1938.  L. O. GUNDERSON  2,127,730
PROPORTIONING MOTOR
Filed Oct. 18, 1935  4 Sheets-Sheet 1
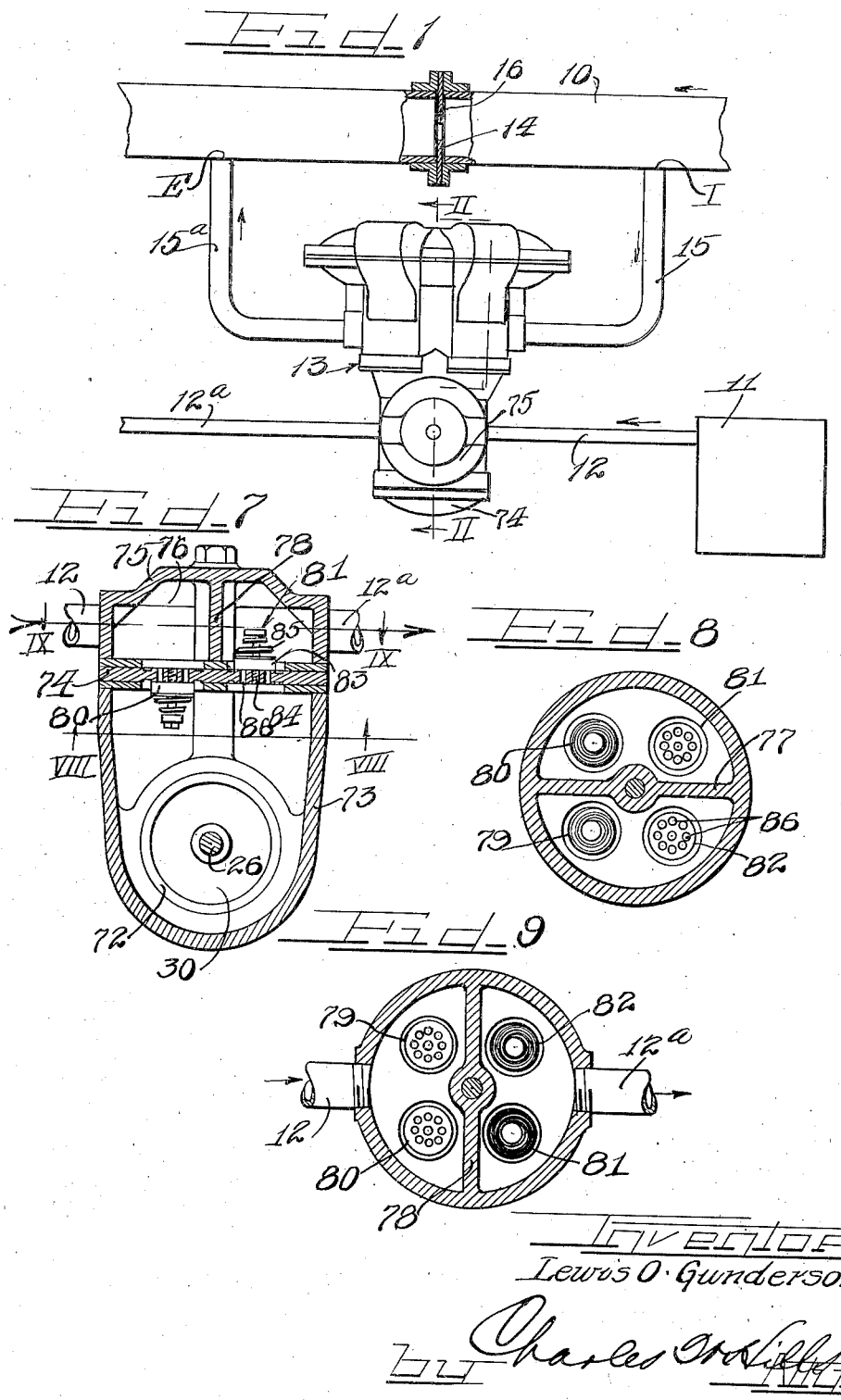
Inventor
Lewis O. Gunderson

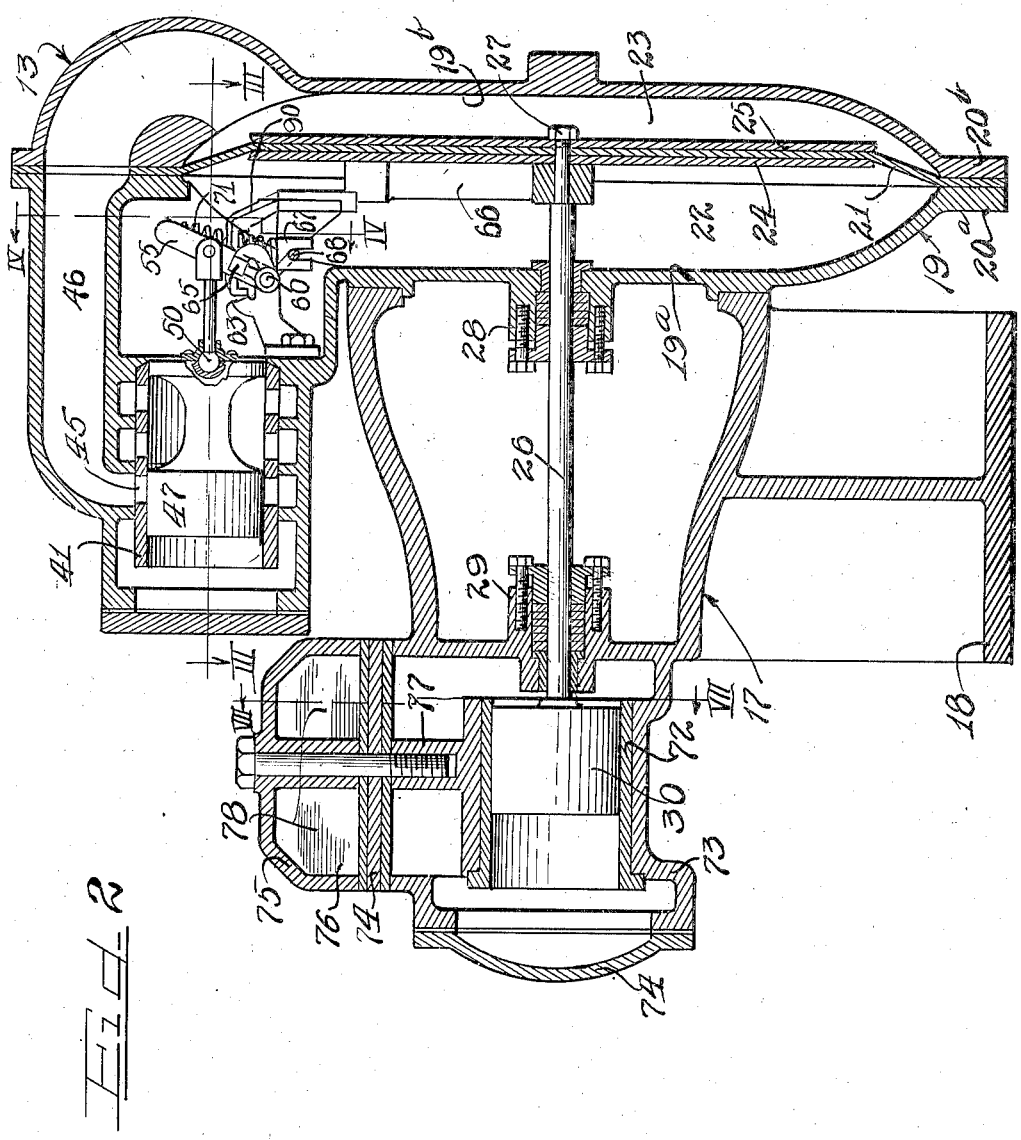

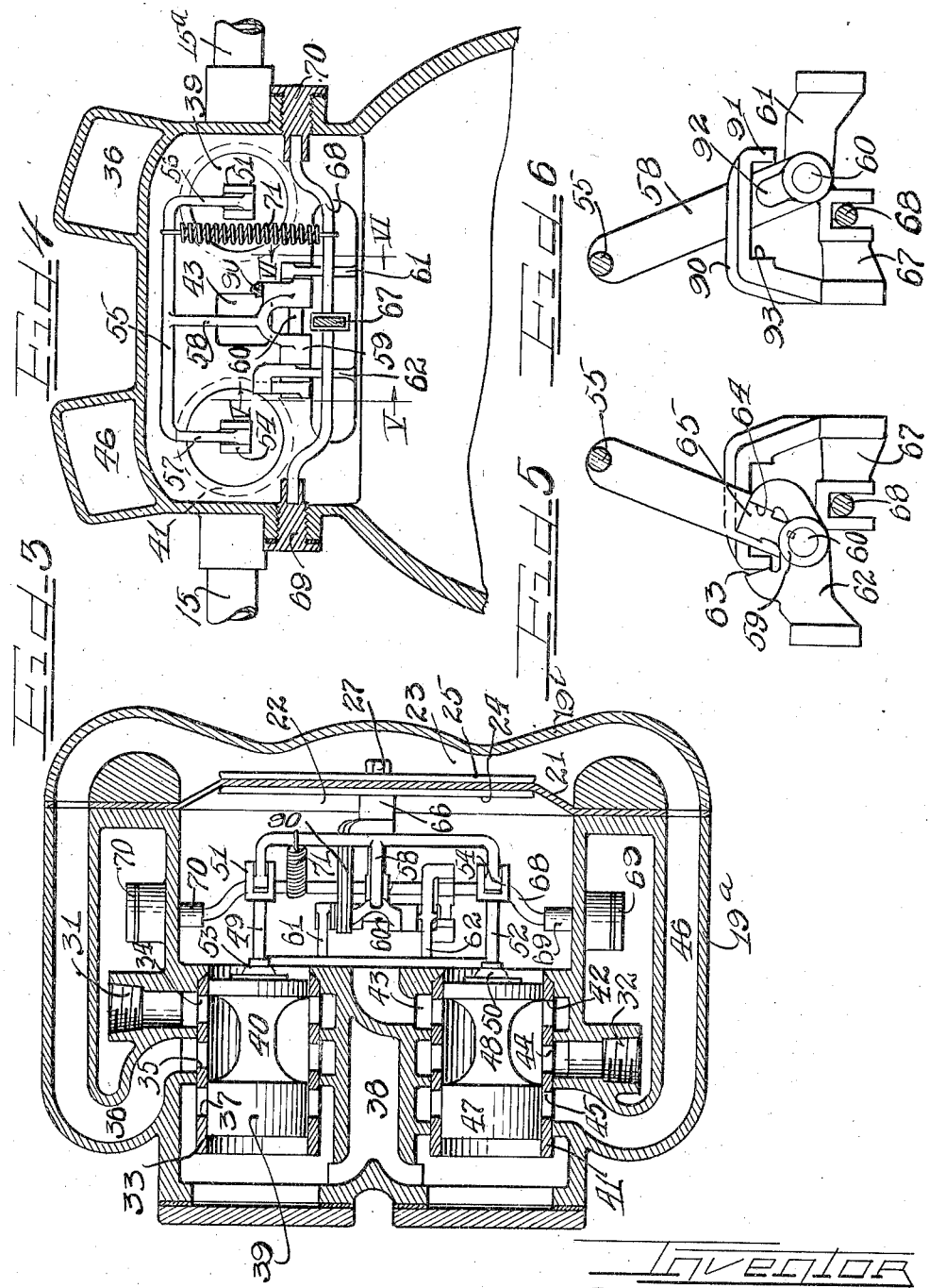

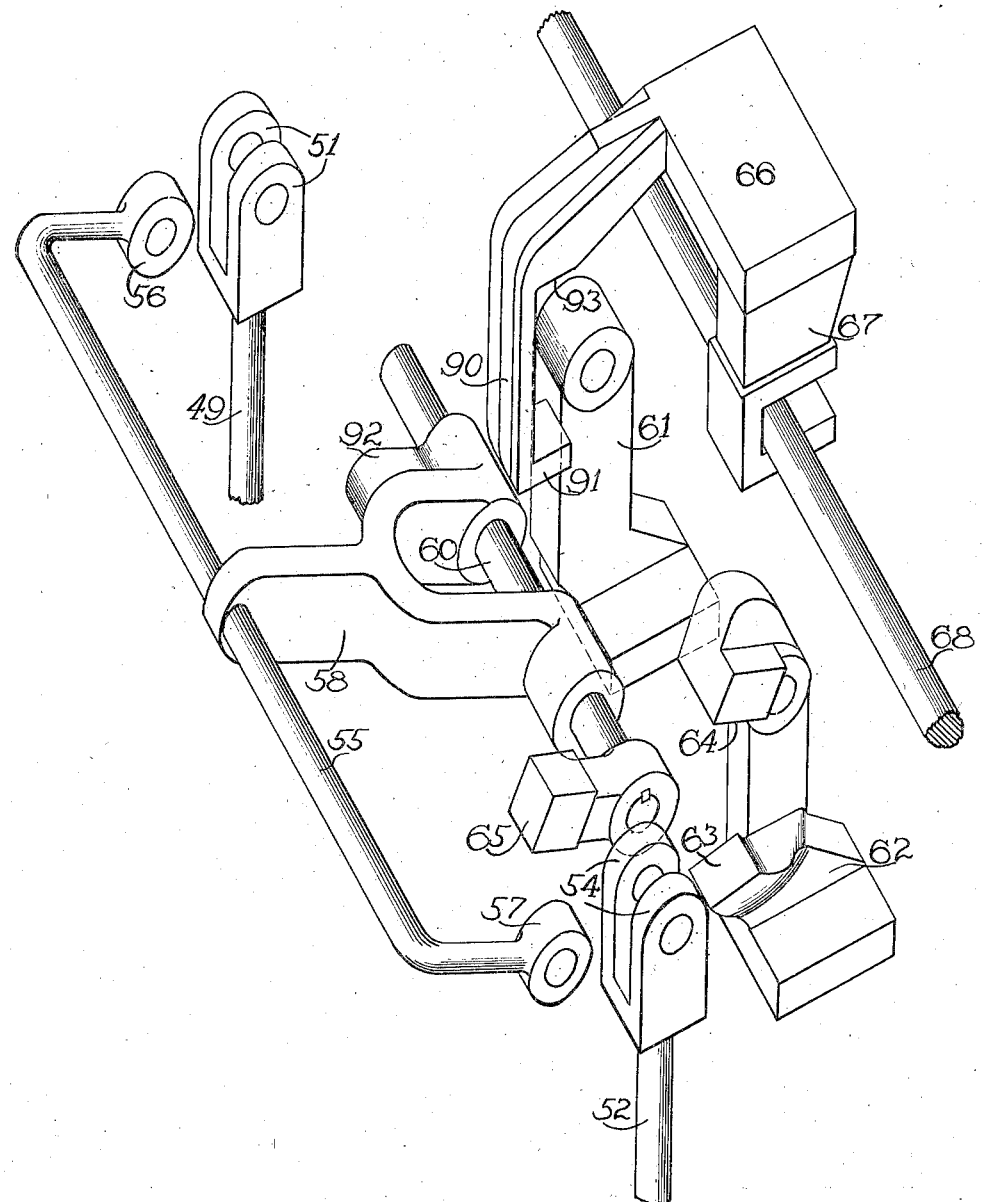

Patented Aug. 23, 1938

2,127,730

UNITED STATES PATENT OFFICE 2,127,730

PROPORTIONING MOTOR

Lewis O. Gunderson, Chicago, Ill., assignor to Electro-Chemical Engineering Corporation, Chicago, Ill., a corporation of New Jersey Application October 18, 1935, Serial No. 45,590

1 Claim. (Cl. 121—48)

This invention relates to a proportioning motor and more particularly to a device operated by a pressure drop in the flow of a primary fluid for effecting a proportionate flow of a secondary fluid.

One of the important objects of this invention is to provide a proportioning device that is operated by a pressure drop in the flow of a primary or power fluid without consumption or waste of the primary fluid and therefore adapted to be located in any desired position without regard to drainage facilities.

Another object of this invention is to provide a fully automatic proportioning device operated by a pressure drop in the flow of a main or primary fluid to effect a proportionate flow of a secondary fluid.

Another important object of this invention is to provide a device for effecting a flow of a chemical or other treating solution in proportion to the volume rate of flow of a primary fluid, the device being so arranged as to be fully automatic in its operation whenever there is a flow of the primary fluid, thus eliminating the necessity of periodic attention such as has been generally required by devices of this general type heretofore used.

It is a further important object of this invention to provide a proportioning motor that operates on a relatively low hydrostatic pressure, whereby a small pressure drop in the flow of the main or power fluid may be utilized to operate the device automatically and without substantially increasing the back pressure or hydrostatic head on the prime mover of the fluid in the main fluid line.

Other and further important objects of this invention will be apparent from the disclosures in the specification and the accompanying drawings.

This invention (in a preferred form) is illustrated in the drawings and hereinafter more fully described.

On the drawings:

Figure 1 is a top plan, partly diagrammatic view of a proportioning device embodying the principles of my invention, with parts broken away and in section, showing the manner of its installation.

Figure 2 is a sectional view taken substantially along the broken line II—II of Fig. 1.

Figure 3 is a sectional view taken substantially along the line III—III of Fig. 2.

Figure 4 is a fragmentary sectional view taken substantially along the line IV—IV of Fig. 2.

Figure 5 is a fragmentary sectional view taken substantially along the line V—V of Fig. 4.

Figure 6 is a fragmentary sectional view taken substantially along the line VI—VI of Fig. 4.

Figure 7 is an enlarged sectional view taken substantially along the line VII—VII of Fig. 2.

Figure 8 is a sectional view taken substantially along the line VIII—VIII of Fig. 7.

Figure 9 is a sectional view taken substantially along the line IX—IX of Fig. 7.

Figure 10 is an exploded perspective view of the toggle mechanism.

As shown on the drawings:

In Fig. 1 the reference numeral 10 indicates a pipe or conduit for the flow of a main fluid. By way of illustration, the fluid passing through the pipe 10 may be water that is to be treated with a chemical solution prior to being allowed to settle, filter, or the like, or prior to its use in steam boilers. The chemical treating solution may be supplied from a reservoir or storage tank 11 and, in accordance with the principles of this invention, caused to flow through a pipe 12 leading therefrom at a rate proportionate to the flow of the water through the main line 10. This proportionate flow of the chemical treating solution is effected by means of my proportioning device, indicated generally by the reference numeral 13.

In order to bring about an effective drop of pressure in the flow of the main fluid through the conduit 10, sufficient to operate the proportioning device 13, an orificed plate 14 may be inserted in said conduit 10 and the device 13 connected in a bypass around said orificed plate 14 provided by the pipe lines 15 and 15a. In accordance with the principles of hydraulics, the hydrostatic pressure of the fluid within the pipe 10 will be greater at the point I where the pipe line 15 is connected into the conduit 10 than it will be at the point E where the pipe line 15a is connected into said conduit.

The amount of the pressure drop between the points I and E may, of course, be controlled by the size of the orifice 16 in the plate 14. In general, a pressure drop of approximately 3 lbs. per sq. in. is entirely satisfactory for the operation of my proportioning motor. It will be understood that other means may be inserted in the main conduit 10 to provide this pressure drop, or that natural friction losses in the conduit due to elbows, restrictions, or the like, may be sufficient to give the required pressure drop for the operation of my proportioning device.

The proportioning device 13, as best shown in

Fig. 2, comprises a central casting 17 having a supporting base 18 formed integrally therewith. A two-part casing 19 is mounted from said casting 17. Said casing 19 comprises a cast-section 19a mounted from said casting 17 and a second cast-section 19b secured to the section 19a throughout their peripheral flanges 20a and 20b.

A flexible diaphragm 21 is secured at its periphery between the flanges 20a and 20b to divide the casing 19 into two chambers, 22 and 23. Said diaphragm 21 may be made of any suitable flexible material, such as leather, rubber, or the like. Preferably a substantial central portion of the diaphragm 21 is made rigid by being clamped between a pair of metal plates 24 and 25, the plates in turn being secured to one end of a rod 26 by means of a nut 27. Said rod 26 extends through packing glands 28 and 29 supported from the cast section 19a and the opposite end of the casting 17, respectively. A piston 30 is mounted upon the free end of the rod 26 for reciprocal movement in accordance with pulsations of the diaphragm 21, as will be shortly explained.

The flow of the main or power fluid through the bypass arm 15 into the device 13 is controlled by valves that are connected to the flexible diaphragm 21 and that will be now described. The power fluid enters from the pipe line 15 into an inlet port 31 (Fig. 3) and leaves the device 13 through an outlet port 32 for return by way of the bypass pipe line 15a into the main conduit 10. The inlet and outlet ports 31 and 32, respectively, are formed in the upper portion of an integral part of the casting 19a.

A slotted, open-ended cylinder or sleeve 33 is positioned in the upper part of the casting 19a adjacent to the inlet 31. Said sleeve 33 is provided with a peripheral slot 34 in register with the inlet 31 and with a spaced slot 35 in register with a passage 36 that communicates with the chamber 23 at the front side of the diaphragm 21. Another peripheral slot 37 opens into a general chamber 38. A reciprocating piston type of valve 39 is mounted within the sleeve 33 for movement therein to control the slot or port openings 34, 35 and 37. For this purpose, the valve 39 has a reduced intermediate portion 40 adapted to span two of such slots or ports to connect the same.

The arrangement with respect to the outlet 32 is somewhat similar. A cylinder or sleeve 41, positioned adjacent the outlet 32, is provided with a plurality of slots or ports, including a port 42 that communicates through a passage 43 into the chamber 22 on the rear side of the diaphragm 21. Another port 44 is aligned with the outlet opening 32 and a third port 45 is aligned with a passageway 46 leading to the chamber 23 on the front side of the diaphragm 21. A reciprocating piston type of valve 47 is positioned for movement within the cylinder or sleeve 41. Said valve 47 is provided with a reduced intermediate portion 48 permitting the valve to span two of the ports, 42, 44 or 45. As in the case of the cylinder or sleeve 33, the cylinder 41 is opened into the general chamber 38 at its one end and into a space communicating with the chamber 22 at its other end.

Valves 39 and 47 are connected to the diaphragm rod 26 through a spring actuated toggle mechanism that will now be described. A stem 49 is connected to the power valve 39 by means of a ball and socket joint indicated by the reference numeral 53 (Fig. 2). The other end of said stem 49 carries a clevis 51. Similarly, a stem 52 is connected to the power valve 47 by means of a ball and socket joint 50 and carries at its free end a clevis 54. A generally T-shaped toggle arm, indicated by the reference numeral 55 (Fig. 4) is formed integrally with dependent arms 56 and 57 pivoted at their ends in the clevises 51 and 54, respectively. The stem 58 of said T-shaped toggle arm 55 is provided with a bifurcated end 59 adapted to be pivotally mounted upon a pin 60 carried by toggle brackets 61 and 62. Said toggle brackets 61 and 62 are suitably mounted from the multi-ported casting of the casting section 19a.

Said toggle bracket 62 is provided with a pair of inclined, opposed stops 63 and 64 (Fig. 5) adapted to cooperate with an abutment 65 (Fig. 10) keyed on the pin 60.

A toggle drive rod bracket 66 (Figs. 2 and 3) is secured on the diaphragm end of the rod 26 in back of the plate 24 and is also secured to said plate for rigidity. Said toggle drive rod bracket carries at its upper end a downwardly opening bifurcated end 67 that is adapted to engage with a toggle spring rod 68. Said toggle spring rod 68 is mounted at its ends in oppositely disposed plugs 69 and 70 (Fig. 4) threaded through walls of the casting 19a. A pair of springs 71 (only one being shown) are mounted under tension between the toggle spring rod 68 and the cross member of the toggle arm 55. These springs aid in effecting a positive throw of the toggle arm 55 and hence of the valves 39 and 47 under the reciprocating action of the diaphragm 21, as will be described in connection with the operation of the device.

With each reciprocation of the flexible diaphragm 21, the piston type of pump 30 is reciprocated within the pump head bushing 72. Said pump head bushing 72 is positioned within an extension 73 of the casting 17. A cover plate 74 closes the open end of said extension 73 in alignment with a pump head bushing 72. A valve plate 74 is positioned between the top of said extension 73 and a casting 75 that encloses a valve chamber 76, said casting 75 being bolted or otherwise secured to said extension.

The chamber in which the reciprocating pump 30 is mounted is divided by a vertically extending partition 77 and the valve chamber 76 is divided by a partition 78 that extends at right angles to the partition 77. In each of the quadrants of the valve plate 74 thus formed, there is positioned a valve, such as the valves 79, 80, 81 and 82. The valves 79 and 80 extend downwardly from the valve plate 74 and the valves 81 and 82 extend upwardly. See Figures 7, 8 and 9.

Each of these valves comprises an apertured disk 83 of soft rubber or the like mounted upon a pin 84 threaded into the valve plate 74 and having an extended end carrying a valve spring 85 under compression. A plurality of apertures 86 extending through the valve plate 74 are covered by each of said valves 83.

The operation of my proportioning device is as follows:

Whenever there is a passage of fluid through the main conduit 10, the drop in pressure caused by the orificed plate 14 causes a flow of a portion of the fluid through the by-pass 15 into the proportioning device 13 and out through the other leg of the by-pass 15a back into the main stream in the conduit 10. With the valves 39 and 47 in the position indicated in Figs. 2 and 3, the main or power fluid enters the inlet 31, passes through the port 34 and out through the port 35 into the passage 36 leading to the chamber 23 on the forward side of the diaphragm 21.

With the diaphragm in its outward position, the power fluid on the inner side of the diaphragm, in the chamber 22, is free to flow outwardly through the passage 43 and the ports 42 and 44 to the outlet 32. From the outlet 32, the power fluid is returned through the branch bypass line 15a to the conduit 10.

Thus, as the power fluid continues to build up in the chamber 23, it forces the diaphragm inwardly while displacing the water on the inner side of the diaphragm through the outlet 32. As the toggle drive arm 66 moves inwardly with the diaphragm, the bifurcated end 67 moves the toggle spring rod 68 over until it passes beyond dead center, that is, beyond the line passing through the axis of the pivot pin 69 and the plane of the toggle arm 55. When this occurs, the toggle springs 71 snap the toggle arm over until the lug 65 comes into abutment with the stop 63 on the bracket 62. This movement, of course, also brings about a movement of the valves 39 and 47 to reverse the ports, now opening the flow through the inlet 31 and port 34 into the inner side of the diaphragm 21, namely into the chamber 22, and closing the flow through the passages 43 and 42. At the same time the passageway 46 is opened through the ports 45 and 44 into the outlet 32 to permit the water on the outer side of the diaphragm 21, namely in the chamber 23, to be vented through the outlet 32.

The throw of the toggle arm 55 is supplemented by a member 90 (Figs. 5 and 6) carried by the bifurcated end 67. Said member 90 has a dependent end flange 91 adapted, in one position, to engage a lug 92 formed integrally with the toggle arm stem 58. An inner shoulder 93 is formed on said member 90 for engagement with said lug 92 when movement is in the opposite direction. The action of the springs 71 is thus supplemented and rendered more positive by the cooperation between the member 90 and the lug 92 in throwing over the toggle arm from one position to the other.

With the diaphragm 21 in the position shown in Fig. 2, that is, with the pump 30 at the right hand end of its stroke and starting toward the left, as viewed in Fig. 2, the inlet valve 80 is about to open up and the outlet valve 81 is closed. As the pump continues its movement toward the left, inlet valve 80 opens and the treating fluid flows into the pump cavity in back of the advancing pump head. The outlet valve 81 is closed but the outlet valve 82 opens to permit the discharge of the treating fluid ahead of the pump head 30 into the discharge line 12a.

On the return stroke of the pump head 30, inlet valve 79 opens and inlet valve 80 closes, while outlet valve 81 opens and outlet valve 82 closes. The treating fluid is then drawn through inlet valve 79 and discharged through the outlet valve 81. Consequently, upon each stroke of the pump head 30, a quantity of the treating fluid equal to the volume displacement of said pump head is discharged into the outlet line 12a. There is thus a proportionate flow of the treating fluid through the line 12—12a so long as there is a flow of the main fluid through the conduit 10.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

A water motor comprising a casing having a circular body portion and a dual cylindrical valve housing offset therefrom marginally thereof, a diaphragm dividing said body portion into two chambers each having passages communicating with the interior of said valve housing, open ended multi-ported sleeves within said valve housing opening into said passages, one of said sleeves having an inlet port and the other an outlet port, double piston-type valves reciprocally mounted within said sleeves for controlling said ports to build up pressure first on one side and then on the other side of said diaphragm, at least one open end of a sleeve acting as a conduit joining a chamber with a port during one position of a valve, a spring toggle mechanism connected to said valves to operate the same and means secured to said diaphragm for actuation of said mechanism to cause a positive throw of said valves and thus effect a pulsation of said diaphragm.

LEWIS O. GUNDERSON.